3,446,411
FIREPROOF CONTAINER FOR OXIDIZABLE
MATERIALS INCLUDING EXPLOSIVES
Orlando Hudson, 313 Ready St.,
St. Marys, Ga. 31558
Filed Sept. 8, 1967, Ser. No. 666,397
Int. Cl. B65d 3/00, 5/00, 1/00, 5/02
U.S. Cl. 229—3.5                                         10 Claims

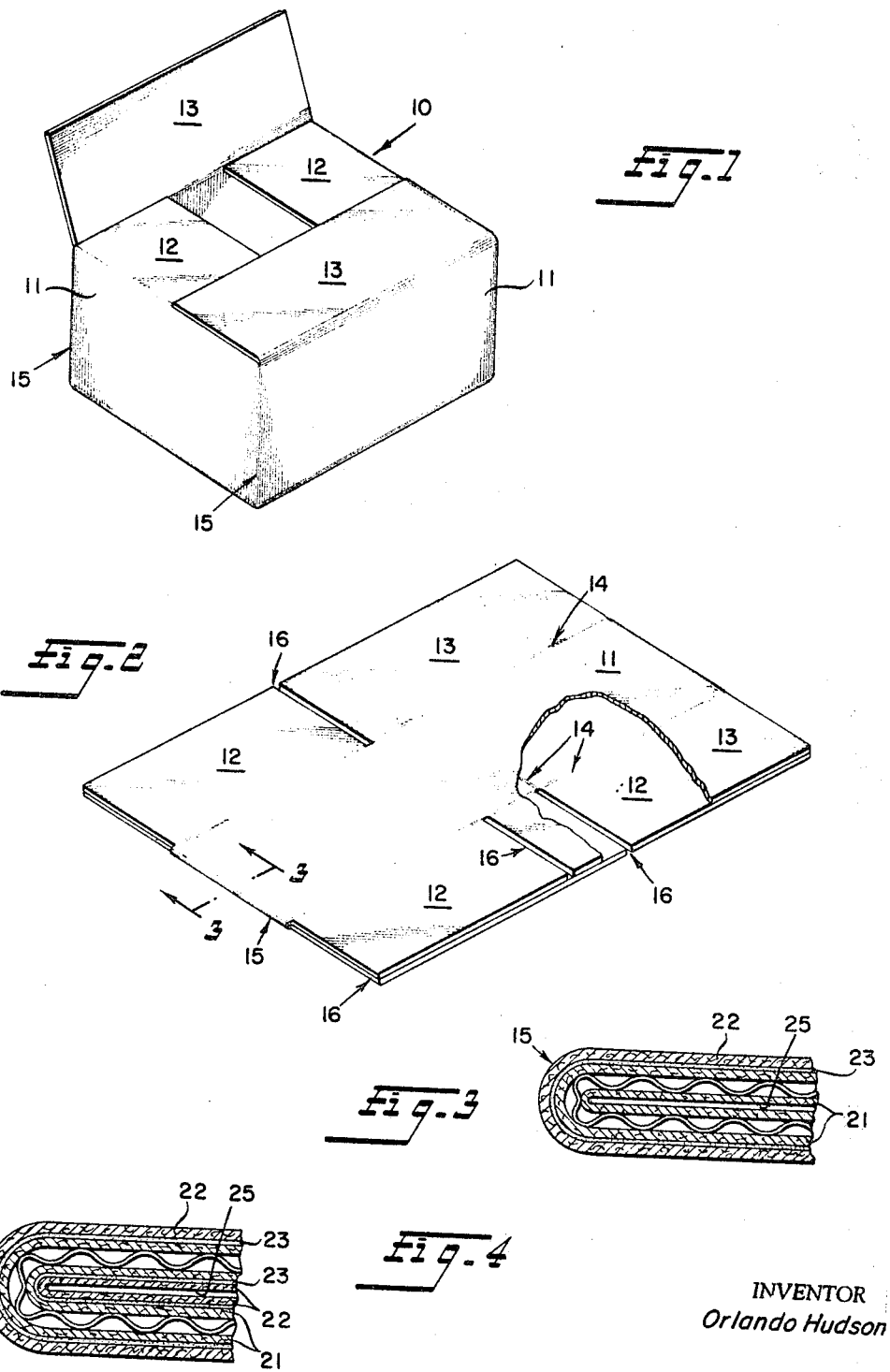

ABSTRACT OF THE DISCLOSURE

A fireproof container made from a laminated material comprising a suitable base layer to which is adhesively secured on one or both sides a fireproof layer. The adhesive sets up without the use of heat. The fireproof layer is relatively thin and is of an asbestos paper composition comprising asbestos fines combined with five to thirty percent cotton. This asbestos paper is sufficiently flexible so that when the laminated sheet is bent or folded the fireproof layer does not split or crack, but maintains a continuous unbroken surface throughout the length of the fold even when the laminated sheet is bent back upon itself, as when an empty carton is collapsed for shipment.

---

This invention relates to a laminated material especially useful in making shipping containers, and more particularly to a fireproof laminated material in which oxidizing materials and commercial explosives may be shipped.

The laminated material of this invention has at least one outer layer of a fireproof asbestos-cotton paper. This outer layer is adhesively secured to a base layer, preferably with self-bonding agent, and is sufficiently flexible to permit the laminated sheet to be flexed or bent back upon itself without cracking or breaking the continuity of the asbestos-cotton paper layer along the crease or fold. This quality of the sheet is of particular significance in the manufacture of collapsible containers such as cartons which, when collapsed to flat condition for shipping, are more sharply bent at diagonally opposite corners than the normal bending at corners of the erected carton.

While asbestos has long been known as a fireproofing and insulating material, it has a number of shortcomings which have prevented it from attaining wide scale usage as a container material. Specifically, asbestos which is a mineral is quite expensive and its physical properties are nonconducive for use in making containers because it is extremely brittle and relatively fragile. While its insulating properties are sometimes employed advantageously, this very property has been found to be a hinderance in effecting efficient, high-speed lamination to other materials. Specifically, asbestos acting as an insulator prevents the heat of customary drying machines from drying and setting up most commercial adhesives. This has been overcome in accordance with the present invention by the use of an adhesive material which will set up without requiring additional heat in order to dry the adhesive. Therefore, it is possible to laminate strips of the asbestos-cotton paper of the present invention to paperboard in strip form.

It has also been found that it is possible to use asbestos fibers of extremely short length in making the laminated strip product of the instant invention. Consequently, it is possible to take asbestos fibers which are so short as to be waste material insofar as textile mills are concerned and to use them in combination with 5 to 30% of long staple cotton to provide the degree of flexibility required in making the containers of the present invention. As a result, it is possible to achieve a significant cost reduction over the steel drums previously used and still ship oxidizing materials and commercial explosives with the assurance that the container is fireproof.

Numerous other advantages of the invention will become readily apparent upon reference to the following detailed description taken in connection with the accompanying drawings, in which:

FIG. 1 is a perspective view of a carton embodying the invention;

FIG. 2 is a perspective view of the carton blank collapsed for storage or shipment; and FIGS. 3 and 4 are enlarged sectional views taken at 3—3 in FIG. 2 showing different forms of the laminated sheet structure.

Referring to FIGURE 1 of the drawings, a carton is indicated generally at 10 and is made from laminated sheet material. Carton 10 has four side walls 11 from which extend inner flaps 12 and outer flaps 13. These side walls and flaps are bendable or foldable along score or crease lines 14 to form corners 15 and the bottom and top walls of the carton. Such a carton is collapsible to the form illustrated in FIG. 2 which shows the flaps 13 separated by slits 16 and extending away from the side wall portions 11 beyond interior and exterior crease lines 14.

The laminated sheet structure shown in FIG. 3 consists of an inner or base layer 21 which may be corrugated boxboard, and an outer asbestos-cotton paper layer 22 secured to the base layer 21 by an adhesive 23. The single asbestos-cotton paper layer may, of course, be secured to the inner instead of the outer layer or, as shown in FIG. 4, an asbestos-cotton paper layer 22 is secured to the inner as well as to the outer surface of the base layer 21. Furthermore, the inner surface of the resulting laminated sheet 25 may be lined with any suitable material, such as a polyethylene coating.

The asbestos-cotton paper composition of the layer 22, hereinafter referred to as "asbestos paper," is preferably in the range of about 5% to 30% long staple cotton added to the asbestos fibres which may be mostly less than half an inch in length, and sometimes referred to as fines. These relatively short fibres are not long enough to be spun into asbestos yarn, so their use in the manufacture of asbestos paper results in savings not only to the carton manufacturer but to the producers of asbestos products as well.

The adhesive 23 is preferably a cold bonding agent, and will be referred to hereinafter as a cold adhesive. It may consist of:

|  | Percent |
|---|---|
| Silicate glue (fireproof) | 70 |
| Polyvinyl acetate | 18 |
| Caseins | 10 |
| Starch | 2 |

The surface of the asbestos paper layer or sheet may be printed upon directly, which is of course advantageous in that separate labels may thereby be eliminated. It is preferred to use a polyethylene bag as a liner material which may be secured directly to the inside of the carton such as by the use of a suitable adhesive. The purpose of the use of a polyethylene bag is to make certain that the carton is waterproof and to avoid sifting of the contents of the carton.

In addition to a base material made of paperboard, it is possible to apply the asbestos-cotton paper material of this invention to other base materials such as plywood, wallboard and the like.

Other uses of the invention in addition to the manufacture of cartons include building of a bulkhead in a single ship where the bottom hold is all in one piece. This construction is accepted by the United States Coast Guard in lieu of a permanent steel bulkhead. Also, the laminates disclosed herein may be used to build a Class A magazine as well as a portable cap magazine in accordance with applicable United States Coast Guard regulations.

The cold adhesive disclosed herein overcomes the problem inherent in the asbestos material acting as an insulator and thereby thwarting the effective use of heat supplied by drying machines in order to set conventional commercial adhesives. The fact that the laminate material may be applied in strip form to paperboard in strip form permits the use of conventional equipment to feed, blank, slit, score and crease the composite laminate in a rapid and efficient manner.

Typical contents for the containers disclosed herein include ammonium nitrate prills and nitro-carbo-nitrate (NCN). A typical shipment will include 50 pounds or more of the foregoing materials.

The asbestos material itself after being mined is classified either No. 1 or No. 2 crude. It is preferred to use the No. 1 crude which is then passed through a crusher and emerges as asbestos fibers which are classified in accordance with the length of the fibers.

As has been noted, the textile mills require the longest fibers in their operation. The fibers are further subjected to a sifting process and when the fibers reach a classification of 5–R, testing 0–0–6 Quebec standards, the fibers are too short to spin into asbestos yard, but are suitable for the present invention. However, at this time they are still too brittle for use in a foldable sheet, so to give them added strength to go through subsequent handling and spinning operations, a percentage of long staple cotton is added from approximately 5 to 30% by volume. This yields an asbestos-cotton material having the required flexibility for use in the present invention. Moreover, in this form the asbestos has sufficient adherence or body so that it will not break away or separate from the mixture. It is in this form that the mixture may be calendered into strip stock and strip laminated to paperboard material.

It is thought that the invention and many of its attendant advantages will be obvious from the foregoing description and it is apparent that various changes may be made in the form, construction and arrangement of parts without departing from the spirit and scope of the invention.

What is claimed is:
1. A fireproof container formed from a laminated sheet comprising:
   a base layer of paperboard material;
   a fireproof layer of a composition comprising asbestos and five to thirty percent cotton fibers by volume; and
   an adhesive disposed between and securing said base and fireproof layers together;
   whereby said fireproof layer presents a continuous unbroken surface on the container, including those areas along the folded or bent corners thereof.

2. A fireproof contained as defined in claim 1 wherein said fireproof layer forms the outer surface of the container.
3. A fireproof container as defined in claim 1 wherein said fireproof layer forms the inner surface of the container.
4. A fireproof container as defined in claim 1 wherein a said fireproof layer forms the outer and inner surfaces of the container.
5. A fireproof container as defined in 1 wherein the asbestos fibres in said fireproof layer are less than one-half inch in length.
6. A fireproof container as defined in claim 1 wherein said adhesive is a cold bonding agent.
7. A fireproof contained as defined in claim 6 wherein said adhesive is a cold bonding agent consisting of:

|  | Percent |
|---|---|
| Silicate glue (fireproof) | 70 |
| Polyvinyl acetate | 80 |
| Caseins | 10 |
| Starch | 2 |

8. A fireproof container as defined in claim 1 wherein the container is a collapsible carton having portions folded back upon other portions, thereby producing relatively sharp bends or corners, and the said fireproof layer maintains its integrity throughout said bends or corners.
9. A flexible fireproof sheet having a composition comprising asbestos fibers and from about five to thirty percent cotton fibre by volume and wherein said asbestos fibres are substantially all less than one-half inch in length.
10. A flexible fireproof laminated sheet comprising a base layer;
   a fireproof layer having a composition comprising asbestos fibers from about five to thirty percent cotton fibre by volume; and
   an adhesive therebetween for bonding said layers together.

References Cited
UNITED STATES PATENTS

| | | | |
|---|---|---|---|
| 1,508,069 | 9/1924 | Rose | 229—3.5 |
| 2,454,218 | 11/1948 | Schulman | 161—205 |
| 3,018,206 | 1/1962 | Hood et al. | 161—205 |
| 3,066,847 | 12/1962 | Fortune | 299—3.5 X |
| 3,301,462 | 1/1967 | Starr | 229—37 |

DAVID M. BOCKENEK, *Primary Examiner.*

U.S. Cl. X.R.

161—205; 229—37.